United States Patent
Kanda

(10) Patent No.: US 8,526,053 B2
(45) Date of Patent: *Sep. 3, 2013

(54) DATA PROCESSING APPARATUS AND METHOD OF USING THE SAME

(75) Inventor: Yoshimichi Kanda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,472

(22) Filed: Sep. 6, 2012

(65) Prior Publication Data

US 2012/0327475 A1   Dec. 27, 2012

Related U.S. Application Data

(63) Continuation of application No. 13/267,622, filed on Oct. 6, 2011, now Pat. No. 8,294,957, which is a continuation of application No. 11/168,343, filed on Jun. 29, 2005, now Pat. No. 8,045,237.

(30) Foreign Application Priority Data

Jul. 9, 2004 (JP) ................. 2004-202820

(51) Int. Cl.
*G06K 15/00* (2006.01)
*H04N 1/00* (2006.01)

(52) U.S. Cl.
USPC ........................................ 358/1.16; 358/401

(58) Field of Classification Search
USPC ................. 358/448, 498, 496, 474, 404, 444, 358/401, 1.16, 1.18
See application file for complete search history.

(56) References Cited

U.S. PATENT DOCUMENTS

| | | | |
|---|---|---|---|
| 5,867,611 A | 2/1999 | Kanda | |
| 6,164,614 A | 12/2000 | Lim et al. | |
| 6,636,462 B1 | 10/2003 | Drynkin et al. | |
| 6,959,443 B2 | 10/2005 | Ohgaki | |
| 7,031,232 B2 | 4/2006 | Klein | |
| 7,226,225 B2 | 6/2007 | Mochizuki et al. | |
| 7,280,353 B2 | 10/2007 | Wendel et al. | |
| 8,294,957 B2 * | 10/2012 | Kanda | 358/401 |
| 2003/0030992 A1 | 2/2003 | Kim et al. | |
| 2003/0206397 A1 | 11/2003 | Allgeyer et al. | |
| 2005/0097582 A1 | 5/2005 | Kim et al. | |
| 2010/0260024 A1 | 10/2010 | Wendel et al. | |

FOREIGN PATENT DOCUMENTS

| | | |
|---|---|---|
| JP | 9-314953 | 12/1997 |
| JP | 11-213644 | 8/1999 |
| JP | 2002-281197 A | 9/2002 |
| JP | 2003-69765 | 3/2003 |
| WO | WO 02/47088 A1 | 6/2002 |

* cited by examiner

*Primary Examiner* — Jerome Grant, II
(74) *Attorney, Agent, or Firm* — Oblon, Spivak, McClelland, Maier & Neustadt, L.L.P.

(57) ABSTRACT

In a data processing apparatus of the present invention, a disk unit storing a disk is mounted on the apparatus such that the surface of the disk is parallel to the direction of a shock or an impact. This protects the disk unit and therefore the disk from the influence of shocks and impacts as far as possible.

20 Claims, 7 Drawing Sheets

DATA PROCESSING APPARATUS AND METHOD OF USING THE SAME

CROSS-REFERENCE TO RELATED APPLICATIONS

The present application is a continuation application of and claims the benefit of priority under 35 U.S.C. §120 from U.S. application Ser. No. 13/267,622, filed Oct. 6, 2011 now U.S. Pat. No. 8,294,957, which is a continuation of U.S. application Ser. No. 11/168,343, filed Jun. 29, 2005, now U.S. Pat. No. 8,045,237, the entire contents of each of which is incorporated herein by reference, and is based upon and claims the benefit of priority under 35 U.S.C. §119 from prior Japanese Patent Application No. 2004-202820, filed Jul. 9, 2004.

BACKGROUND OF THE INVENTION

1. Field of the Invention

The present invention relates to a data processing apparatus and a method of using the same.

2. Description of the Background Art

Today, it is a common practice with a digital copier to mount a hard disk unit storing a magnetic disk as a disk. The hard disk unit is used to implement an electronic sorting function, image registering function or similar function of temporarily storing image data. As for the electronic storing function, the images of documents are read while being written to the hard disk unit, and then all the images thus stored in the hard disk unit are sequentially read out in order of page and printed. This function therefore allows copies to be driven out of the copier in a sorted condition without resorting to the conventional sorter including a plurality of bins. On the other hand, the image registering function causes a plurality of formatted images to be stored in the hard disk unit as registered images and allows them to be repeatedly printed any time without being again read by a scanner, as desired.

The problem with the magnetic disk stored in the hard disk unit is that it is susceptible to shocks and impacts and is apt to suffer an unrecoverable trouble when subjected to a shock or an impact. Japanese Patent Laid-Open Publication No. 2001-228659, for example, proposes to use a rubber brush for isolating structural members from vibration generated by, e.g., a motor. This document, however, does not teach any measure against shocks and impacts apt to act on the hard disk unit although it may successfully cope with vibration.

SUMMARY OF THE INVENTION

It is an object of the present invention to provide a data processing apparatus capable of isolating, when a shock or an impact acts on the apparatus, a hard disk unit from the shock or the impact as far as possible and reducing the frequency of trouble that may occur in the hard disk unit inclusive of a hard disk stored therein, and a method of using the same.

In accordance with the present invention, in a data processing apparatus including a disk unit loaded with a disk, the disk unit is positioned in a direction scarcely susceptible to the influence of directions in which shocks and impacts may act on the disk unit.

Further, in accordance with the present invention, in a method of using a data processing apparatus including a disk unit loaded with a disk, the disk unit is mounted to the data processing apparatus just before the actual operation of the apparatus.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
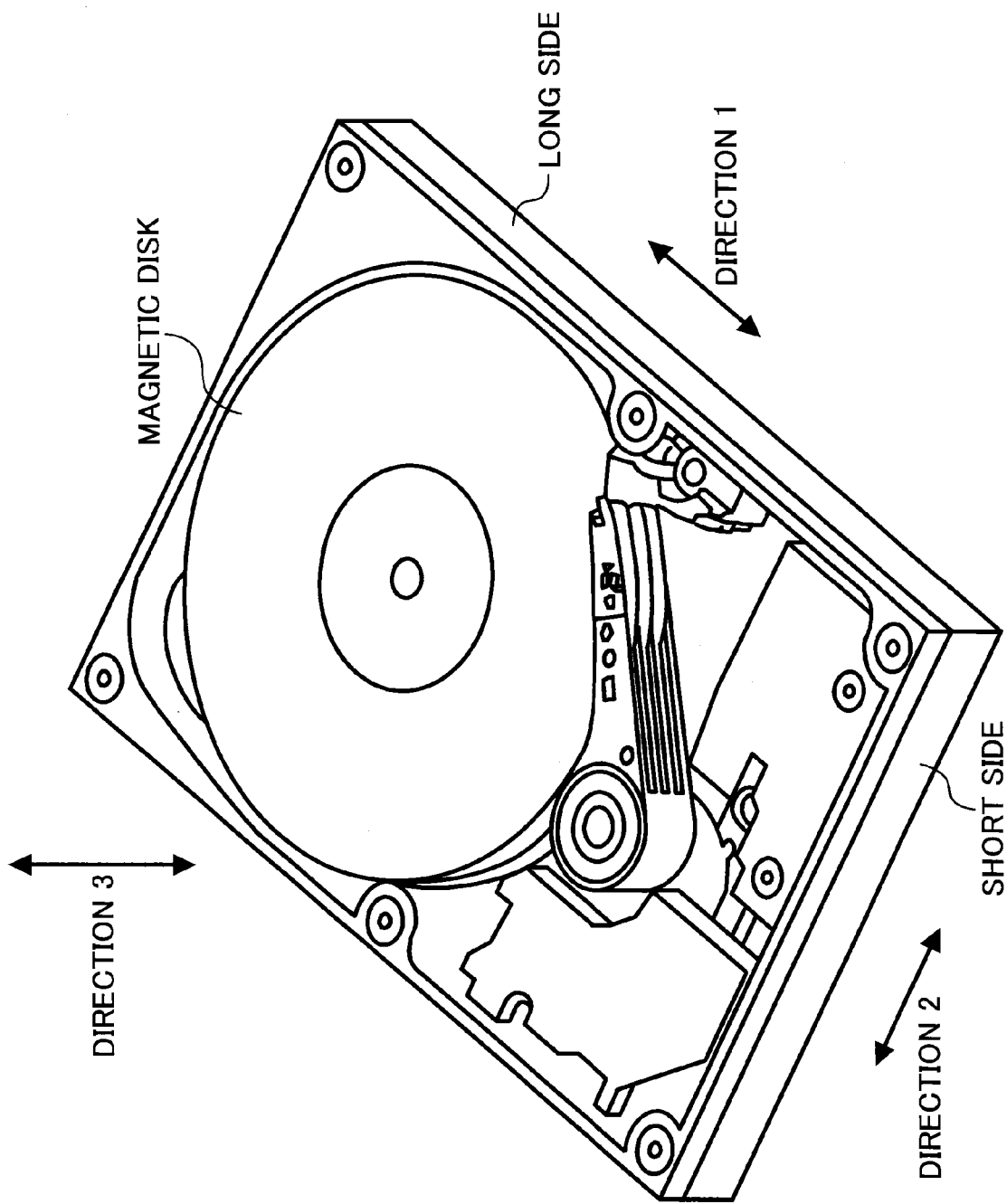
FIG. 1 is a view showing a specific configuration of a hard disk unit storing a hard disk and to which the present invention is applied.

Referring to FIG. 1 of the drawings, a specific configuration of a disk unit, storing a magnetic disk therein, is shown. The disk unit shown in FIG. 1 is susceptible to shocks and impacts, particularly a shock or an impact acting in a direction 3 perpendicular to the surface of the magnetic disk. More specifically, a shock or an impact imparted to the disk unit in the direction 3 causes a magnetic head to hit against the magnetic disk and damage its surface.

Figure 2:
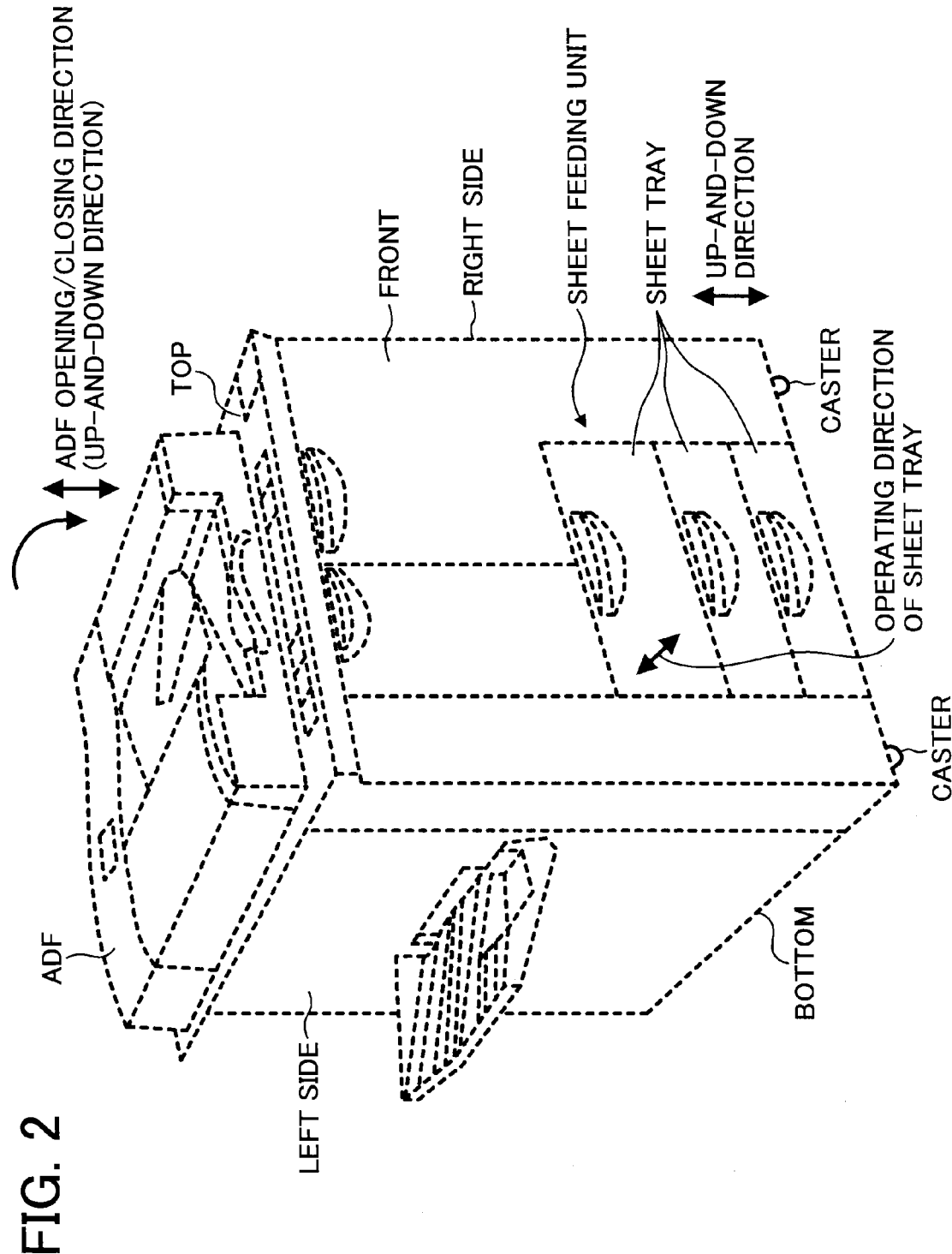
FIG. 2 is a view showing a specific configuration of a data processing apparatus implemented as a digital copier.

I found that if the direction in which a shock or an impact acts on the surface of the magnetic disk is parallel to the disk surface, i.e., a direction 1 or 2 shown in FIG. 2, the former damages the latter little, compared to a shock or an impact acting in the direction 3. More specifically, the present invention is characterized in that in a data processing apparatus loaded with a hard disk unit storing a magnetic disk, a disk unit is mounted in a position scarcely susceptible to a shock or an impact, i.e., in such a position that the surface of the disk is parallel to the direction of a shock or an impact.

It is to be noted that the magnetic disk stored in the disk unit is only illustrative and may be replaced with, e.g., a CD-RW (Compact Disk-ReWritable) or a DVD (Digital Versatile Disk) by way of example. The disk unit is referred to as a hard disk unit when storing a magnetic disk.

FIG. 2 is a perspective view showing a data processing apparatus implemented as a digital copier by way of example. As shown, a sheet feeding unit is mounted on the front portion of the digital copier and includes a plurality of sheet trays. An ADF (Automatic Document Feeder) is mounted on the top of the digital copier. Casters, part of which is shown in FIG. 2, are mounted on the bottom of the digital copier. A finisher or similar optional unit, not shown, may be located on the right side or the left side of the digital copier. In FIG. 2, the side of the digital copier opposite to the front side will be referred to as the rear side. It should be noted that the front side, rear side, right side, left side, top and bottom mentioned above refer to, when the casing of the digital copier is generally parallelepiped, the front side, rear side, right side, left side, top and bottom of the parallelepiped casing, respectively.

In the digital copier shown in FIG. 2, a shock or an impact acts in any one of three different directions, i.e., a direction in which any one of the sheet trays is moved into or out of the casing of the digital copier (operating direction hereinafter), a direction in which the ADF is opened upward or closed downward (up-and-down direction hereinafter), and a direction in which the digital copier itself is lifted, lowered and pushed to a desired place (also up-and-down direction hereinafter). When the copier is pushed, the shock or impact increases when the ground is not flat.

Figure 3:
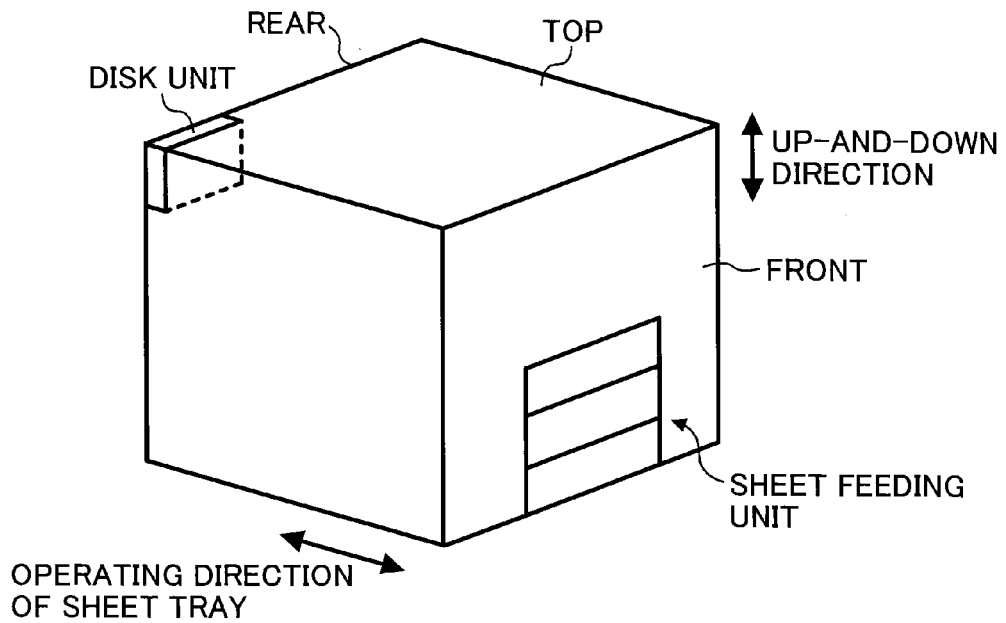
FIG. 3 is a view showing a conventional configuration in which the disk unit is mounted on the data processing apparatus.
Figure 4:
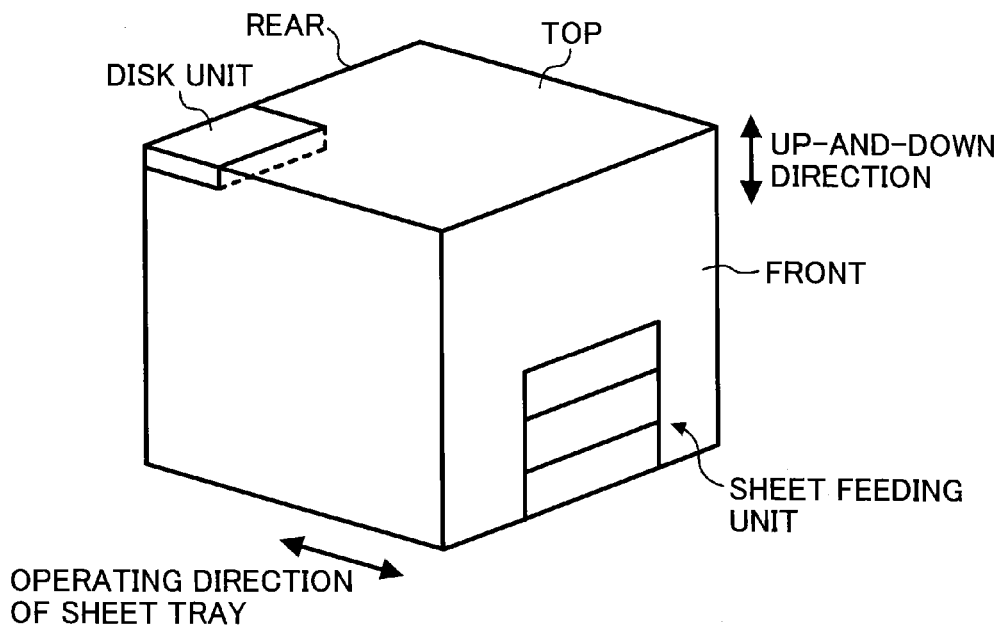
FIG. 4 is a view showing another conventional configuration in which the disk unit is mounted on the data processing apparatus.

FIG. 3 shows a specific position in which the disk unit has customarily been mounted on the digital copier from the storage standpoint. As shown, the disk unit is positioned such that the surface of the disk stored therein is parallel to the rear surface of the casing of the copier and therefore to the operating direction of the sheet trays. FIG. 4 shows another conventional position of the disk unit mounted on the digital copier. As shown, the disk unit is positioned such that the surface of the disk stored in the disk unit is parallel to the top of the casing and therefore perpendicular to the up-and-down direction of the casing.

The position of the disk unit shown in FIG. 3 is not desirable in that the disk surface of the disk unit, positioned perpendicularly to the operating direction of the sheet trays, is subject to a shock or an impact perpendicular thereto when any one of the sheet trays is moved into or out of the casing. Also, the disk surface of the disk unit shown in FIG. 4 is perpendicular to the up-and-down direction of the casing and therefore subject to a shock or an impact perpendicular thereto when the ADF is opened or closed in the up-and-down direction or when the digital copier is lifted, lowered and pushed during transport.

As stated above, in the conditions shown in FIGS. 3 and 4, a shock or an impact is apt to act perpendicularly on the disk surface of the disk unit and thereby bring about an unrecoverable trouble in the disk unit. More specifically, when the disk unit is a hard disk unit by way of example, the shock or impact is apt to damage a magnetic disk or a magnetic head included in the unit. Also, if the disk unit is a DVD disk unit, the shock or impact is apt to damage a DVD disk or a pickup included in the unit.

The present invention is successful to solve the problems of the conventional configurations stated above. Briefly, in accordance with the present invention, a disk unit loaded with a disk is mounted on a data processing apparatus in a position scarcely susceptible to a direction of a shock or an impact, i.e., in such a position that the surface of the disk stored in the disk unit is parallel to the direction of a shock or an impact. This successfully protects the disk unit mounted on the apparatus from the influence of a shock or an impact acted on the apparatus as far as possible, thereby reducing the frequency of trouble to occur in the disk unit inclusive of the disk stored therein.

Figure 5:
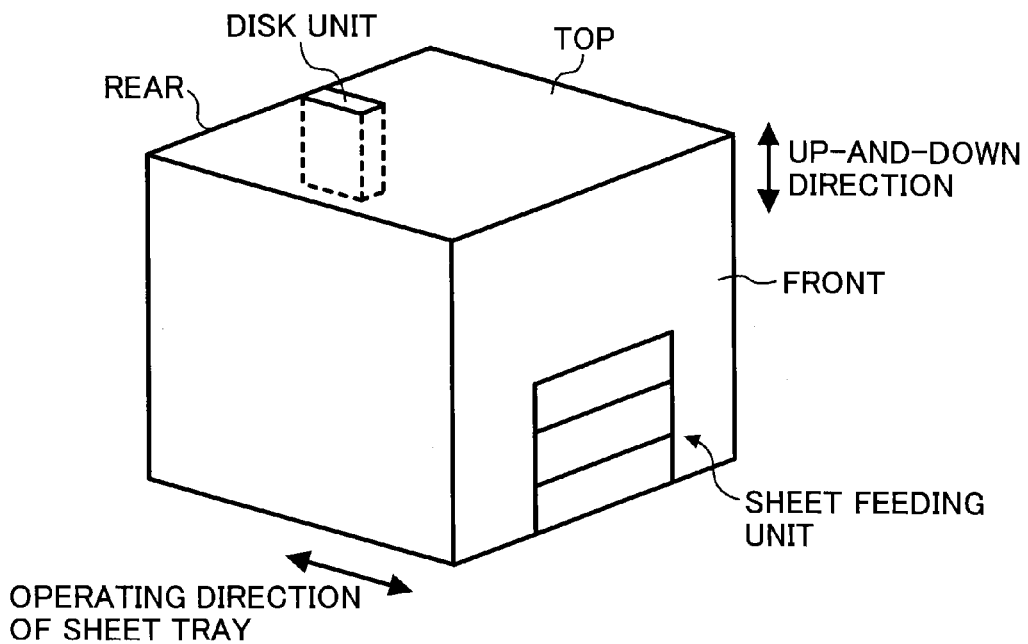
FIG. 5 is a view showing a specific condition wherein the disk unit is mounted on the data processing apparatus in accordance with the present invention.

FIG. 5 shows a specific position of the disk unit mounted on the digital copier or data processing apparatus shown in FIG. 2 in accordance with the present invention. As shown, the surface of the disk stored in the disk unit is parallel to the sides, i.e., the right side and left side of the casing of the copier and therefore to both of the operating direction of the sheet trays and up-and-down direction of the casing.

More specifically, in FIG. 5, the disk unit is positioned such that the disk surface of the disk unit is parallel to the operating direction of the sheet trays and parallel to the up-and-down direction of the casing of the digital copier in which the ADF is opened or closed. The disk surface is therefore parallel to the direction in which shocks and impacts are likely to act.

Figure 6:
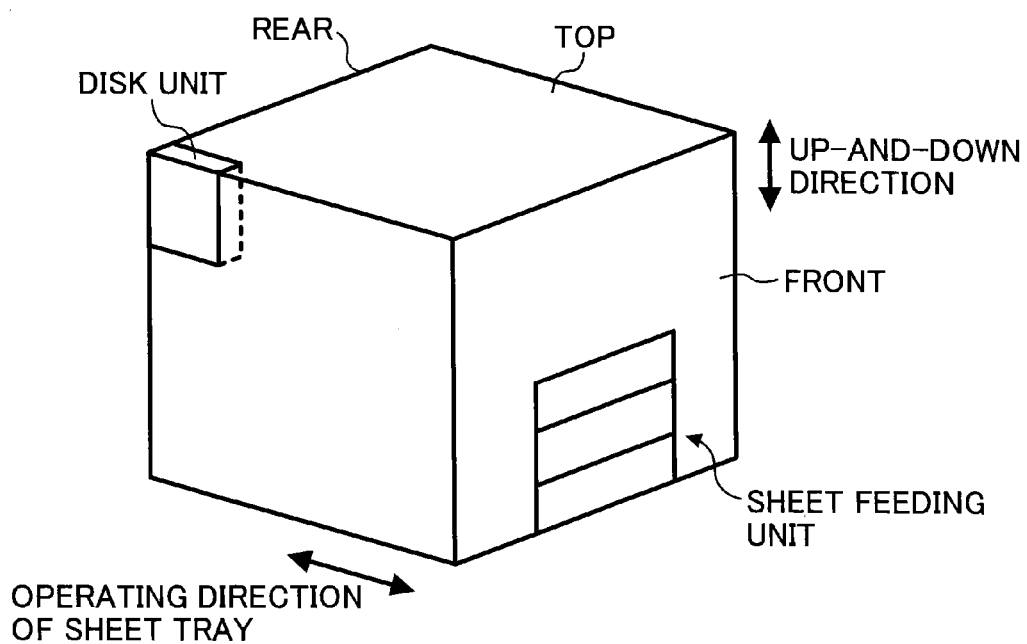
FIG. 6 is a view showing another specific condition wherein the disk unit is mounted on the data processing apparatus in accordance with the present invention.
Figure 7:
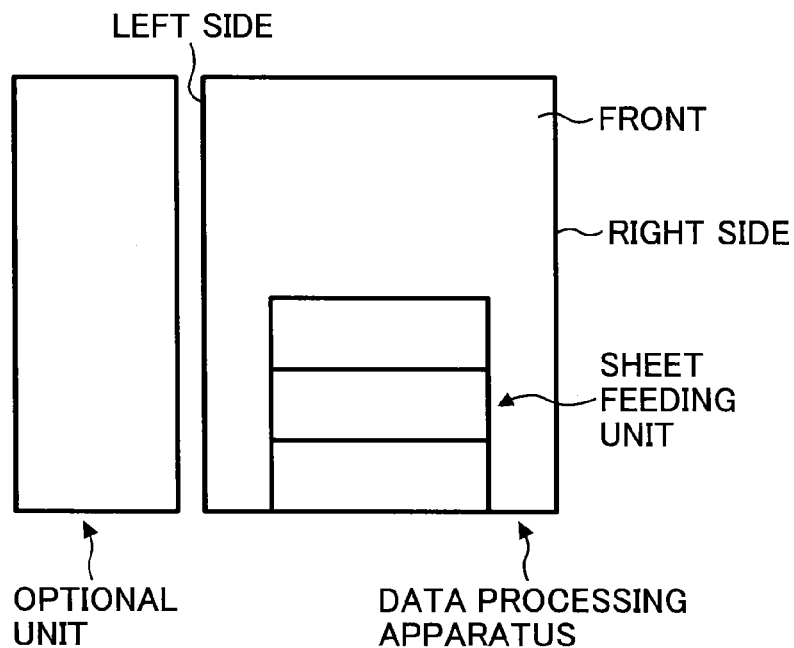
FIG. 7 is a view showing a case wherein a finisher or similar optional unit adjoins one side of the data processing apparatus.

FIG. 6 shows another specific position of the disk unit mounted on the digital copier in accordance with the present invention. As shown, the disk unit is mounted to the casing along one side of the casing. However, this position is undesirable when a finisher or similar optional unit adjoins the left side and/or the right side of the casing, as shown in FIG. 7 in a front view; an optional unit is located at the left side of the casing in FIG. 7. More specifically, the optional unit obstructs the mounting and dismounting of the disk unit.

In light of the above, the disk unit should preferably be mounted on the center of the rear wall of the casing. When the disk unit is mounted on the center of the rear wall of the casing, as stated above, it can be easily mounted or dismounted even when a finisher, for example, adjoins the right side or the left side of the casing.

In accordance with the present invention, the disk unit should preferably be disposed in the casing of the data processing apparatus so as not to protrude to the outside of the casing.

Also, in accordance with the present invention, the disk unit should preferably be removably mounted to the data processing apparatus. For example, the disk unit may be removably fastened to the rear wall of the casing by screws or may be slidably mounted on a slide member mounted on the rear wall of the casing. In any case, the disk unit can be dismounted from the casing at the time of, e.g., transport or conveyance of apparatus and then mounted to the casing later just before the actual operation of the apparatus.

Figure 8:
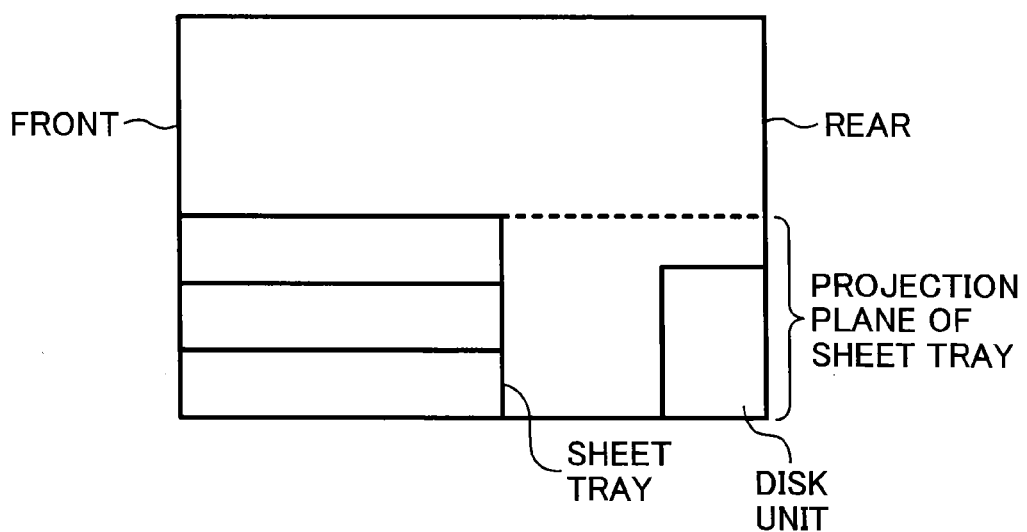
FIG. 8 is a view showing a specific condition wherein the disk unit is mounted such that the surface of the disk unit overlaps a plane in which a sheet tray mounted on the data processing apparatus is projected on the rear wall of the apparatus.

In accordance with the present invention, in the case of the data processing apparatus including the sheet trays, the disk unit should preferably be mounted to the apparatus such that its surface does not overlap a plane in which the sheet trays are projected on the rear surface of the casing of the apparatus. More specifically, as shown in FIG. 8 in a sectional side elevation, should the surface of the disk unit overlap the above projection plane, a shock ascribable to the movement of any one of the sheet trays into or out of the casing would be directly imparted to the disk unit.

Figure 9:
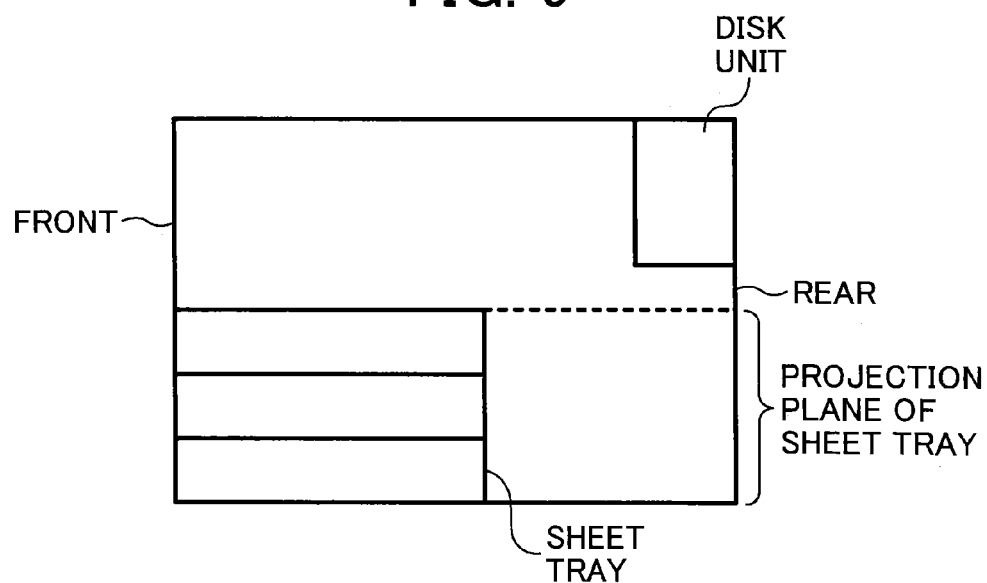
FIG. 9 is a view showing a specific condition wherein the disk unit is mounted such that the surface of the disk unit does not overlap the above plane.
Figure 10:
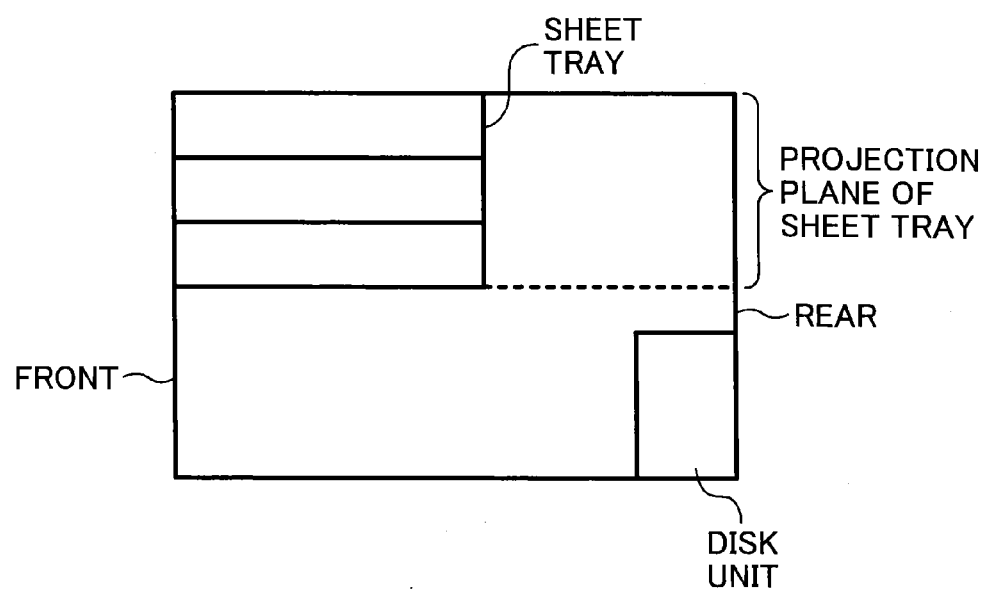
FIG. 10 is a view showing another specific condition wherein the disk unit is mounted such that the surface of the disk unit does not overlap the above plane.

FIGS. 9 and 10 each are a side elevation showing a specific configuration capable of solving the above problem. As shown, the surface of the disk unit is mounted to the rear wall of the casing of the apparatus body such that its surface does not overlap a plane in which the sheet trays are projected on the rear surface of the casing. This prevents a shock ascribable to the movement of any one of the sheet trays into or out of the casing from being directly applied to the disk unit.

Further, in accordance with the present invention, the hard disk unit has a parallelepiped body whose outer contour is defined by preselected length, preselected width and preselected thickness, and a surface thereof defined by the preselected length and width is rectangular. In this configuration, the hard disk unit should preferably be mounted to the casing of the apparatus such that the long sides of the above rectangular surface extend in the up-and-down direction of the casing.

Figure 11:
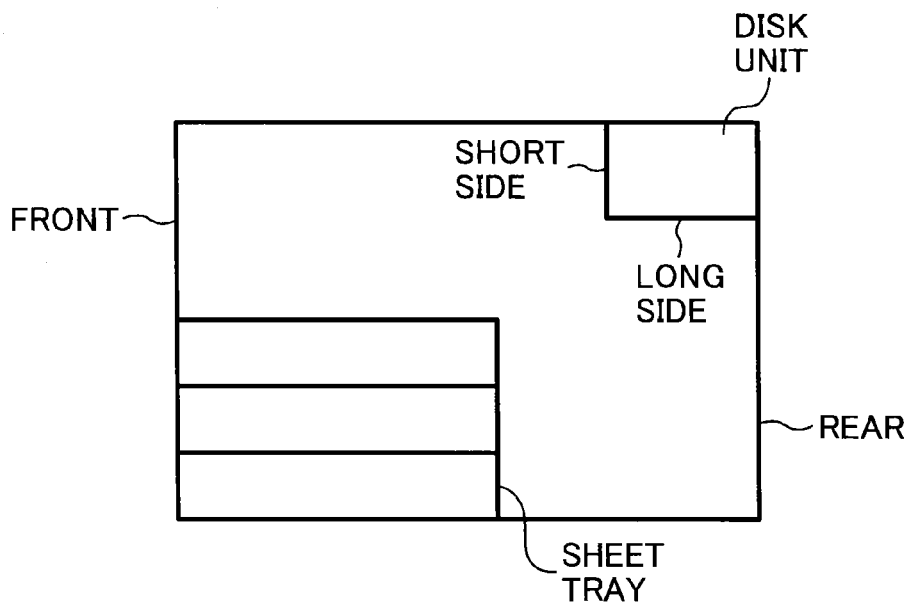
FIG. 11 is a view showing a condition wherein the short sides of a rectangular surface defined by length and width extend in the up-and-down direction of the apparatus.
Figure 12:
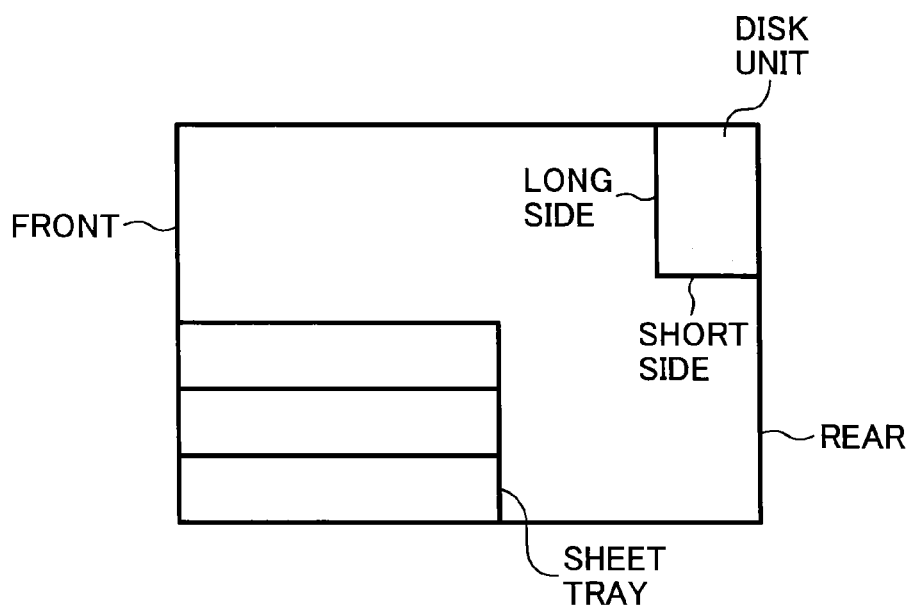
FIG. 12 is a view showing a condition wherein the long sides of the rectangular surface extend in the up-and-down direction of the apparatus.

More specifically, as shown in FIG. 11 in a sectional side elevation, if the hard disk unit is mounted such that the short sides of the rectangular surface thereof defined by the length and width extend in the up-and-down direction, then the hard disk unit occupies a substantial space in the direction of depth of the casing. In the illustrative embodiment, as shown in FIG. 12 in a sectional side elevation, the disk unit is positioned such that the long sides of the rectangular surface extend in the up-and-down direction of the casing of the apparatus. This allows the hard disk unit to be efficiently arranged in the limited space of the casing.

Moreover, in accordance with a method of using the data processing apparatus with the disk unit in accordance with the present invention, the hard disk unit can be mounted to the apparatus just before the actual operation of the apparatus and in the position scarcely susceptible to the influence of the directions of shocks and impacts. Stated another way, the hard disk unit does not have to be mounted on the apparatus during, e.g., transport or conveyance of the apparatus. It is therefore not necessary to be aware of the influence of shocks and impacts on the hard disk unit during transport or the conveyance of the apparatus. Consequently, the frequency of trouble of the hard disk unit, more specifically the trouble of the magnetic disk or the magnetic head, is reduced.

While the above description has concentrated on a digital copier, the present invention is applicable any other data processing apparatus including a disk unit.

In summary, the present invention has various unprecedented advantages, as enumerated below.

(1) In a data processing apparatus including a disk unit storing a disk, the disk unit is mounted in a position scarcely susceptible to the directions of shocks and impacts. This successfully protects the disk unit mounted on the apparatus from the influence of a shock or an impact acted on the apparatus as far as possible, thereby reducing the frequency of trouble to occur in the disk unit inclusive of the disk stored therein.

(2) The disk unit can be removably mounted to the casing of the data processing apparatus. It is therefore possible to dismount the disk unit from the casing at the time of, e.g., transport or conveyance of apparatus and then mount it to the casing later just before the actual operation of the apparatus.

(3) The disk unit is positioned at the center of the rear wall of a casing included in the data processing apparatus. The disk unit can therefore be easily mounted to or dismounted from the casing even when a finisher or similar optional unit adjoins the right side or the left side of the casing.

(4) The disk unit is disposed in the casing and therefore does not protrude to the outside of the casing.

(5) In the case of a data processing apparatus including sheet trays, the disk unit is mounted to the apparatus such that its surface does not overlap a plane in which the sheet trays are projected on the rear surface of the casing of the apparatus. This prevents a shock ascribable to the movement of any one of the sheet trays into or out of the casing from being directly applied to the disk unit.

(6) The hard disk unit has a parallelepiped body whose outer contour is defined by preselected length, preselected width and preselected thickness, and a surface thereof defined by the preselected length and width is rectangular. In this configuration, the hard disk unit is mounted to the casing of the apparatus such that the long sides of the above rectangular surface extend in the up-and-down direction of the casing. This allows the disk unit to be efficiently arranged in the limited space of the apparatus.

(7) In a method of using the data processing apparatus with the disk unit, the hard disk unit can be mounted to the apparatus just before the actual operation of the apparatus and in the position scarcely susceptible to the influence of the directions of shocks and impacts. Stated another way, the hard disk unit does not have to be mounted on the apparatus during, e.g., transport or conveyance of the apparatus. It is therefore not necessary to be ware of the influence of socks and impacts on the hard disk unit during transport or the conveyance of the apparatus. Consequently, the frequency of trouble of the hard disk unit, more specifically the trouble of the magnetic disk or the magnetic head, is reduced.

Various modifications will become possible for those skilled in the art after receiving the teachings of the present disclosure without departing from the scope thereof.

What is claimed is:

1. A data processing apparatus, comprising:
    a sheet tray; and
    a disk unit, wherein
    the sheet tray is configured to hold at least a sheet, and the disk unit is configured to hold a disk, such that, when the sheet tray holds at least a sheet and the disk unit holds a disk, a readable surface of the disk held by the disk unit is parallel to a moving direction of the sheet tray and perpendicular to a face of at least the sheet held by the sheet tray, or to a surface of the sheet tray which contacts the face of at least the sheet.

2. The data processing apparatus as claimed in claim 1, wherein the disk unit is mounted above or below the sheet tray with respect to an orientation of the apparatus for operation.

3. The data processing apparatus as claimed in claim 1, wherein the disk unit includes a hard disk unit storing a magnetic disk as the disk.

4. The data processing apparatus as claimed in claim 3, wherein:
    the hard disk unit has a parallelepiped body defined by a predefined length, a predefined width, and a predefined thickness, and includes a rectangular surface defined by the predefined length and the predefined width, and
    the disk unit is mounted such that long sides of the rectangular surface extend in an up-and-down direction with respect to an orientation of the apparatus for operation.

5. The data processing apparatus as claimed in claim 1, wherein the disk unit includes an optical disk drive.

6. The data processing apparatus as claimed in claim 5, wherein the disk is a DVD (Digital Versatile Disk) or a CD (Compact Disk).

7. The data processing apparatus as claimed in claim 6, wherein the disk is re-writable.

8. The data processing apparatus as claimed in claim 1, wherein the readable surface of the disk is a readable/writable surface from which data is read or to which data is written.

9. The data processing apparatus as claimed in claim 1, wherein the disk unit is removable from the apparatus.

10. The data processing apparatus as claimed in claim 1, further comprising the disk, which is held by the disk unit, and at least the sheet, which is held by the sheet tray.

11. A data processing apparatus, comprising:
    tray means for holding at least a sheet; and
    disk means for holding a disk, wherein
    when the tray means holds at least a sheet and the disk means holds a disk, a readable surface of the disk held by the disk means is parallel to a moving direction of the tray means and perpendicular to a face of at least the sheet held by the tray means, or to a surface of the tray means which contacts the face of at least the sheet.

12. The data processing apparatus as claimed in claim 11, wherein the disk means is mounted above or below the tray means with respect to an orientation of the apparatus for operation.

13. The data processing apparatus as claimed in claim 11, wherein the disk means includes a hard disk unit for storing a magnetic disk as the disk or an optical disk drive for storing an optical disk as the disk.

14. The data processing apparatus as claimed in claim 11, wherein the readable surface of the disk is a readable/writable surface from which data is read or to which data is written.

15. The data processing apparatus as claimed in claim 11, wherein the disk means is removable from the apparatus.

16. The data processing apparatus as claimed in claim 11, wherein the disk is removable from the apparatus.

17. The data processing apparatus as claimed in claim 11, further comprising the disk, which is held by the disk means, and at least the sheet, which is held by the tray means.

18. A data processing apparatus, comprising:

a sheet tray to hold at least a sheet such that a face of at least the sheet faces a base surface of the sheet tray, when the sheet tray holds at least the sheet; and a disk unit to hold a disk, wherein when the disk is held by the disk unit, a readable surface of the disk held by the disk unit is parallel to a moving direction of the sheet tray and perpendicular to the face of at least the sheet held by the sheet tray, when the sheet tray holds at least the sheet, or to the base surface of the sheet tray.

19. The data processing apparatus as claimed in claim 18, further comprising the disk, which is held by the disk unit.

20. The data processing apparatus as claimed in claim 18, further comprising at least the sheet, which is held by the sheet tray.

* * * * *